(12) United States Patent
Rögner et al.

(10) Patent No.: US 7,825,553 B2
(45) Date of Patent: Nov. 2, 2010

(54) TERMINAL BOARD AS WELL AS AN ELECTRICAL MACHINE

(75) Inventors: Werner Rögner, Arzberg (DE); Ralph Hille, Bad Alexandersbad (DE); Gerald Zimmerer, Waldershof (DE)

(73) Assignee: ABM Greiffenberger Antriebstechnik GmbH, Marktredwitz (DE)

( * ) Notice: Subject to any disclaimer, the term of this patent is extended or adjusted under 35 U.S.C. 154(b) by 292 days.

(21) Appl. No.: 12/045,268

(22) Filed: Mar. 10, 2008

(65) Prior Publication Data

US 2008/0218012 A1    Sep. 11, 2008

(30) Foreign Application Priority Data

Mar. 10, 2007 (EP) .................................. 07004988

(51) Int. Cl.
*H02K 11/00* (2006.01)
(52) U.S. Cl. .......................................... 310/71; 310/43
(58) Field of Classification Search ................... 310/43, 310/71, 89; 439/709
See application file for complete search history.

(56) References Cited

U.S. PATENT DOCUMENTS

| | | | |
|---|---|---|---|
| 5,942,822 A * | 8/1999 | Iwata et al. ..................... | 310/71 |
| 6,271,608 B1 * | 8/2001 | Haydock et al. ................ | 310/71 |
| 6,476,527 B2 * | 11/2002 | Ballard et al. ............... | 310/68 D |
| 6,664,678 B2 * | 12/2003 | Shimizu ....................... | 310/71 |
| 6,707,186 B2 * | 3/2004 | Oppitz ......................... | 310/71 |
| 6,936,942 B1 * | 8/2005 | Okazaki et al. ............... | 310/71 |
| 7,002,271 B2 * | 2/2006 | Reed et al. .................... | 310/71 |
| 7,109,618 B2 * | 9/2006 | Cha ............................ | 310/71 |
| 2003/0098622 A1 | 5/2003 | Lino | |

FOREIGN PATENT DOCUMENTS

| | | |
|---|---|---|
| DE | 4342761 A1 | 6/1995 |
| EP | 1315269 A1 | 5/2003 |
| FR | 1119947 | 6/1956 |
| FR | 2801442 A1 | 5/2001 |

OTHER PUBLICATIONS

European Search Report dated Aug. 10, 2007.

* cited by examiner

*Primary Examiner*—Thanh Lam
(74) *Attorney, Agent, or Firm*—Laurence A. Greenberg; Werner H. Stemer; Ralph E. Locher

(57) ABSTRACT

A terminal board, which is for a housing-less asynchronous motor, includes an electrically insulating base extending in a longitudinal direction and in a traverse direction. A device fastens the base to an electrical machine and another device enables a plurality of terminals to be inserted into the base. The base has a bearing surface that curves concavely in the transverse direction and that is essentially straight in the longitudinal direction. The terminal board can be attached to an asynchronous motor that has a cylindrical stator extending in the longitudinal direction. The motor also has a movably positioned rotor that is located inside of the stator and that is connected to the rotor. The terminal board is introduced in the longitudinal direction of the stator where a number of terminals are inserted. By using the terminal board, a housing-less electrically powered machine can be constructed as small as possible.

19 Claims, 5 Drawing Sheets

TERMINAL BOARD AS WELL AS AN ELECTRICAL MACHINE

BACKGROUND OF THE INVENTION

Field of the Invention

The invention concerns a terminal board for a housing-less electrical machine, in particular for a housing-less asynchronous motor, with electrically insulating base extending in a longitudinal direction and in a transverse direction, includes the means for fastening to the electrical machine and means for introducing a number of terminals. The invention further concerns an electrical machine, in particular an asynchronous motor, with a cylindrical stator extending along a longitudinal direction, with a movably disposed rotor on the inside of the stator and with a main shaft extending in a longitudinal direction connected to the rotor, whereby the main shaft is mounted on bearing plates disposed at both ends.

A terminal board of a previously known type has been introduced for connecting utility lines to an electrical machine. Moreover the terminal board exhibits an electrically insulating base made, for example, out of ceramic or an appropriate thermoset plastic, which can be attached to the electrical machine. On the base are further held a number of metal terminals, whereby the terminals are either already set into the base or are held on it, for example, by means of a force locking and/or form-locking device. Above the terminals the motor-side connection lines are in electrical contact with the utility lines. In the usual manner both the motor-side connection lines and the utility lines are attached respectively by means of cable lugs to the corresponding terminals. The electrical contact and attachment to it are, for example, by means of washers and screw caps, which are checked upon clamping the cable lug onto threads of the respective terminal against one another, An electrical machine of a previously known type, which manages without a housing since the stator is held between bearing plates, exhibits a cylindrical stator, inside of which a rotor is movably mounted. The rotor is connected to the movable mounting with a main shaft axially penetrating the stator, which is mounted at both ends at the stator's disposed bearing plates. For a motor or generator application of the electrical machine, this exhibits on the rotor and/or on the stator a number of winding strands, which are in electrical contact with the motor-side connection lines. Moreover the motor-side connection lines are run to the terminals of a prescribed terminal board, and there are electrically connected to an external utility line. The terminal board is hereby fastened for safer electrical contact on-site to one of the two bearing plates. The stator usually includes three winding strands, which are guided into a groove of a cylindrical sheet-metal wrap.

In the case of a electrical synchronous motor, a number of magnetic poles are disposed spread over this periphery for an inside rotor, which at or above a corresponding application of power of the winding strands of the stator synchronously rotate the moving magnetic field produced. In the case of an synchronous motor, a number of usually rapidly shut winding strands or bars are disposed at the rotor, whereby the rotor subsequently impedes induction in the winding strands or bars facing the moving magnetic field of the stator, that is, it rotates asynchronously. In particular the arrangement as an asynchronous motor is frequently installed for an electrical supply, since this arrangement is cost-effective and robust.

The approach of both a synchronous and an asynchronous motor usually takes place by means of a three-phase current or by means of a frequency converter for each winding strand in phase-adjusted alternating current.

An electrical machine, in which the stator and the rotor are disposed in a housing, and in which a terminal board for electrical contact from the motor-side connection lines is provided to external utility lines, is exemplified in DE 102 27 725 A1.

An electrical machine of the aforementioned type and in particular an asynchronous motor is frequently installed for powering a so-called wheeled transport vehicle. The main shaft of the electrical machine is connected to it either above a flat gear or above a bevel gear for a track wheel of the wheeled transport vehicle. Beneath a wheeled transport vehicle are installed on it devices for receiving, transporting, and supplying loads, in particular pallets or the like, such as, for example, in a/the warehouse. Such a wheeled carrying vehicle is, for example, a so-called consigner, a forklift, or a stacker truck. The electrical machine described is also installed for powering a so-called seated cleaning vehicle or similar.

In order to construct the electrical machine in the drive unit in particular of a wheeled transport vehicle, there is as a rule only limited construction space available. Since the drive unit of a wheeled transport vehicle is adjustably located on a steering gear, in particular the outside dimensions of the electrical machines must certainly not be exceeded.

BRIEF SUMMARY OF THE INVENTION

One purpose of the invention is to provide a terminal board for a housing-less electrical machine, with as small as possible a construction size to be achieved. A further purpose of the invention is to provide an electrical machine with a terminal board that exhibits the smallest possible construction dimensions.

For a terminal board known from prior art, which exhibits an electrically insulating base extending in a longitudinal direction and in a transverse direction, including the means for fastening to an electrical machine and means for installing a number of terminals, the first-mentioned purpose according to the invention is thus achieved, that the base exhibit a bearing surface that curves concavely in a transverse direction and is essentially straight in the longitudinal direction.

The invention thereby proceeds from the consideration that a terminal board according to prior art, which is mounted on a bearing plate, offers the advantage of easier accessibility for connecting external utility lines in place. On the other hand, the terminal board in such an arrangement is in a more exposed position, which presents an increased danger of breakage in constructing an electrical machine.

The invention further proceeds from a consideration that a terminal board developed according to this construction for fastening to a bearing plate of an electrical machine necessarily increases the space for construction and in particular the casing envelope of the electrical machine.

Lastly, the invention proceeds from the fact that the bearing plates of a housing-less electrical machine, based on its requirement for on-site construction, exhibit greater outside dimensions than the stator. In order to facilitate screwing down the electrical machine, the outside dimensions of the bearing plates extend beyond those of the stator. The invention therefore recognizes that based on this arrangement, space for construction can be located along the cylindrical stator, set into a terminal board, without the casing envelope of the electrical machine being substantially increased. This is therefore accomplished in that the bearing surfaces of the base are concavely curved in the transverse direction and are essentially straight in the longitudinal direction. In this way the terminal board can be disposed on it in the longitudinal direction of the cylindrical stator, whereas up to now unused construction space was used for the housing-less electrical machine. The use of the terminal board indicated, which can be disposed longitudinally to the stator of the electrical machine, leads to a considerable reduction in construction dimensions compared to the type of connection implemented up to now.

The base can be manufactured from an optionally suitable insulating material. For example, this may be a ceramic or a so-called thermoset plastic. In particular a thermoset plastic is used, which is fireproof and thus is in accordance with country-specific safety regulations for the electrical machine.

In a preferred embodiment, the concave curvature of the bearing surface exhibits different degrees of bend. This embodiment offers the great advantage that one and the same terminal board for the electrical machine can be installed, for stators exhibiting different circumferences. Thus a separate terminal board does not need to be used for each electrical machine here, so that the various types and therewith the costs of manufacturing are reduced.

For attaching the terminal board to the electrical machine, gluing, compression, or a screw are provided. In an embodiment appropriate as a as a means for attaching to the electrical machine onto the base a through hole running in the lengthwise direction is introduced. This through hole permits a suspending the terminal board at one of the cheese-head screw, to which in the case of a housing-less electrical machine the bearing plates included in the stator are both screwed against one another. In a particular, simpler type and manner and without providing additional means of fastening the terminal board a freely disposed cheese-hear screw can thereby be set on the mounting of a housing-less electrical machine next to one another on a bearing plate and be moved into the desired end position opposite the stator by the cheese-head screw. Because in the end-mounted position the cheese-head screw is fastened on both sides, there is held fast on one suitable size of the base the terminal board in the end position under tension by means of the cheese-head screw running in a longitudinal direction against the periphery of the cylindrical stator.

To obtain additional security against movement of the terminal board above the cheese-head screw, in a preferred embodiment an abutting threaded hole is introduced into the base at the through hole. Into this threaded hole in the end mounting position of the terminal board a set screw can be inserted, which with its shaft operates against the cheese-head screw penetrating to the through hole.

In a further preferred embodiment the upper boundary of the bearing surface is modified if the base bends convexly in the transverse direction and is constructed essentially flat in the longitudinal direction. By means of this embodiment a further reduction of the outside dimensions is effected with the terminal board fitted to an electrical machine. By means of the chamfer radially outstanding corners avoided in particular relative to the electrical machine.

To fasten the terminals these can be either set onto the base, clamped, or screwed down tight to it. In an appropriate refinement for installing the or a terminal, a force locking and/or form-locking security against movement is provided. Thereby secure fastening of the terminal permits in particular the security against rotational movement with problem-free installation of a cable lug to the terminal. The force or form locking fit can for example be manufactured with a polygonal connection. But a screw or clamp is also possible for providing security against movement.

In a particular embodiment for rotational-free reception of the or a terminal into the bearing surface respectively a multiangled recess is introduced, in which in the base in a direction toward the upper boundary surface, a counterbore is constructed in a penetrating cylindrical drill hole. In this embodiment a terminal provided is inserted at the shaft end with a corresponding multicornered element into a multiangled recess from beneath the bearing surface through the corresponding recess by means of the penetrating cylindrical drill hole. The cylindrical shaft of the terminal then projects out of the upper boundary surface of the base, while the terminal itself with its multicornered element is held fast in the multiangled recess. In the end mounting position of the terminal board it is no longer possible for the terminal to fall out, because the bearing surface of the stator is lying on it. Upward the terminal is secured by its multicornered element, where a counterbore lies in the base constructed by means of the overlying multiangled recess built into the cylindrical drill hole.

Further preferred is having the bearing surface extended in a transverse direction by means of a contact side. The bearing surface lying on the cylindrical stator is hereby extended, so that a more secure and stable hold is provided. The contact side can also be used to install an identification plate, etc.

A further advantage is that the side-bounding boundary surfaces of the base are constructed slanting downward toward the outside in a transverse direction. In this way the outside dimensions in particular in the radial direction are further reduced for the electrical machine. With this the danger of the terminal breaking during the assembly of the electrical machine is thereby reduced, because the further outstanding corners are smoothed out.

In a further preferred embodiment the terminal board is constructed out of a number of, in particular similar individual modules, which can be connected together in a longitudinal direction. Such an embodiment offers the advantage that the terminal board is adjustable to the size of the electrical machine. So, for example, with a different number of individual modules a different number of connection lines is achieved. Also in this way adjustment in the length of the terminal board is made possible altogether.

In a first variant the individual modules are installed differently. For example, a first individual module can, for receiving a terminal and a further individual module, be built as a spacer. It is advantageous from a scientific viewpoint for the individual module according to a second variant to be similarly installed. In this case it is possible for varying terminal boards to accomplish this with a number of individual modules identical in length and in number of terminals. For fabrication only a single form is now made in advance.

The fitability along the longitudinal direction is appropriate, because in this direction the length of the terminal board may vary for different electrical machines. The terminal board is, as has already been mentioned, consists of a cylindrical stator in the longitudinal direction of an electrical machine in the construction.

The fitting together of the individual module may be basically achieved by means of a pressure-locking or compression fit or by means of gluing. For a readymade simple type of fitting together, a plug connection in particular is offered, which is constructed for plugs in the longitudinal direction. This variant permits in particular in an embodiment of a means for fastening to the electrical machine as a cylindrical drill hole a fit together of the terminal at the mounting to the electrical machine. Alternatively a pressure-lock plug connection is also introducible, which permits a fit of the individual modules across the longitudinal direction. In this case the terminal board is connected together in front of its mounting to the electrical machine.

In an appropriate manner each individual module includes the means for fastening to the electrical machine and the means for installing a terminal. In other words, thus each individual module represents a terminal board in its entirety, whereby however a terminal is easily included or received from the individual module. In a usual two-pole terminal board there are thus two individual modules fitted together.

The twice-stated purpose of an electrical machine and in particular for an asynchronous motor, with a cylindrical stator extending in the longitudinal direction and connected to a rotor movably positioned on the inside, a main shaft extending in a longitudinal direction whereby the main shaft in positioned at both end of the stator's disposed bearing plates, is achieved according to the invention whereby a terminal board is provided of the type described lying in a longitudinal direction of the stator, into which a number of terminals are introduced.

Such an electrical machine, provided with a terminal board for electrical contact of the motor-side connection lines with external utility lines, compared to a heretofore used arrangement, a terminal board exhibits at a bearing plate a clearly reduced casing envelope. Because through the arrangement of the terminal board on the periphery of the cylindrical stator, a free-standing construction space was previously required, which, compared to the present bearing plate, is inferior.

In an appropriate manner the bearing plates disposed at both ends of the receiving stator are screwed to one another by means of cheese-head screws. Thereby in particular it is provided that the terminal board is penetrated by a through hole for a cheese-head screw running in its longitudinal direction and lies on the stator with its bearing surface, in particular under tension.

To provide security against movement, the terminal board is advantageous in that it contains a set screw against the cheese-head screw by means of the set screw being screwed into the threaded hole against the cheese-head screw.

The further described advantage relative to the terminal board accordingly allows transfer onto the electrical machine.

DESCRIPTION OF THE INVENTION

Figure 1:
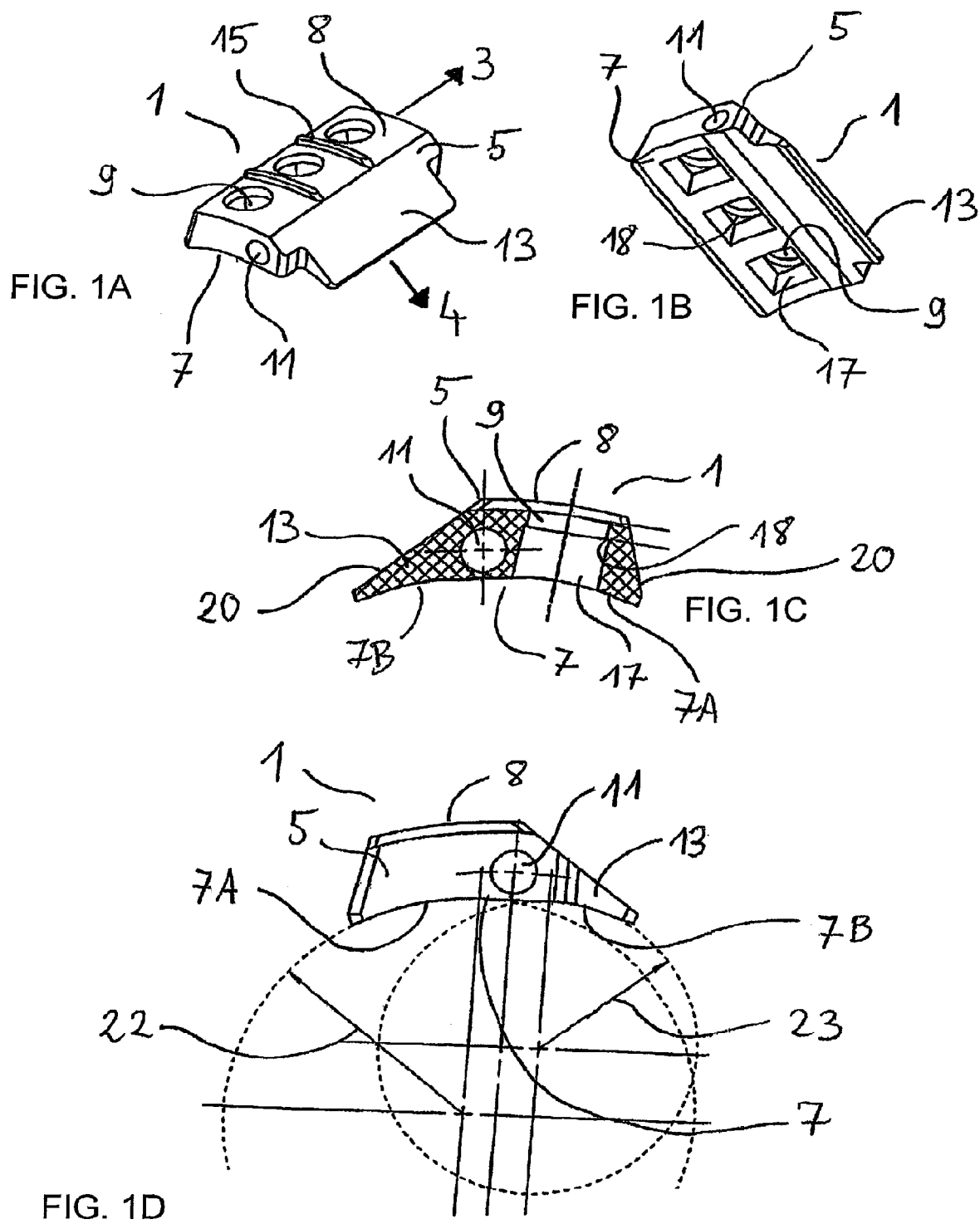
FIG. 1A in a perspective representation, a terminal board with a curved bearing surface, FIG. 1B in a further perspective view, the terminal board according to FIG. 1A with view at the curved bearing surface, FIG. 1C the terminal board according to FIG. 1A in the transverse direction, FIG. 1D in an exploded view a view from the side of the terminal board according to FIG. 1A to illustrate the radius of curvature of the bearing surface, FIG. 2 in a further perspective view the terminal board according to FIG. 1A with a terminal inserted and cable lug fastened to it, FIG. 3 in a perspective view an asynchronous motor with an afore-mentioned bearing plate and a terminal board set on the stator in the longitudinal direction, FIG. 4 in an exploded view a view of the asynchronous machine according to FIG. 3 with a terminal board positioned on a bearing plate and with a terminal board set in a longitudinal direction, FIG. 5A in a perspective view a alternative terminal board with a curved bearing surface, whereby the terminal board can be fir together on a number of individual modules, FIG. 5B in a further perspective view an easily modified individual module of the terminal board according to FIG. 5A from different perspectives, and FIG. 5C the individual module according to FIG. 5B across a longitudinal direction

FIG. 1A depicts, in a perspective view, a terminal board for installing on a cylindrical stator of a housing-less electrical machine. The terminal board 1 includes hereby on a base extending in essentially in a longitudinal direction 3 and in a transverse direction 4. The base 5 is, in the embodiment example, made of an electrically insulating and fireproof thermoset plastic.

The base 5 exhibits on its underside a bearing surface 7 curved concavely in the transverse direction 4 and in a longitudinal direction 3 running essentially straight. With this bearing surface 7 the terminal board 1 can be set in the longitudinal direction onto a cylindrical stator of an electrical machine. The upper boundary surface 8 of the base 5 lying against the boundary surface 7 is constructed to be convex in the transverse direction 4 and again is essentially straight in longitudinal direction 3.

Perpendicular in the longitudinal direction 3 to the base 5 two cylindrical drill holes 9 penetrate, which are constructed to receive metal terminals. In the base 5 is further introduced a through hole 11 penetrating in the longitudinal direction. Further exhibited on the base 5 is a contact side 13 extending in a transverse direction for expanding the bearing surface 7. Between the cylindrical drill holes 9 are constructed respectively webs 15 on the upper boundary surface 8.

In FIG. 1B the terminal board 1 is again represented perspectively with a view at the bearing surface 7. The through hole 11 of the base 5 is seen penetrating in a longitudinal direction, as well as bearing surface 13 expanded in a transverse direction.

Into the bearing surface 7 are introduced from below two multiangled recesses 17, which merge above a counterbore 18 in the cylindrical drill hole 9. A multiangled recess 17, counterbore 18, and cylindrical drill hole 9 respectively form a means for the rotation-free reception of a terminal. The terminal thereby passes from below against the bearing surface 7, by an installed multicornered element with the multiangled recess 17 at its shaft end pressed against the counterbore 18.

FIG. 1C depicts a section through the terminal 1 across the longitudinal direction 3. The section thus cuts through one of the through holes 9.

From this section there then there can be evident the bearing surface 7 concavely curved in the transverse direction, which is connected together at two curved join surfaces 7A and 7B with different radii of curvature. Further the multiangled recess 17 is clearly seen, which passes above a counterbore 18 in the cylindrical drill hole 9 open toward the upper boundary surface 8.

Further readily recognizable is the penetrating through hole 11 of the base 5. In the figure on the left moreover the contact side 13 is recognizable, which is bounded by a slanting side boundary surface 20. The base lying opposite them is likewise closed off by means of a slanting, side boundary surface 20 is represented in an exploded view. Compared to FIGS. 1C and 1D the terminal board 1 is turned 180° in FIG. 1D.

The through hole 11, as well as the contact surface 13 and the upper boundary surface are again evident. It may now be clearly seen that the bearing surface 7 of the base 5 is connected together on the join surfaces 7A and 7B, which exhibit different radii of curvatures. So the joining surface 7A, by means of a bend radius 22 facing the bend radius 22. By installing the bearing surface 7 on two join surfaces 7A and 7B with different radii of curvature 22 and 23 respectively, it is possible for the terminal board 1 to be set on a cylindrical stator of an electrical machine with different circumferences.

Figure 2:
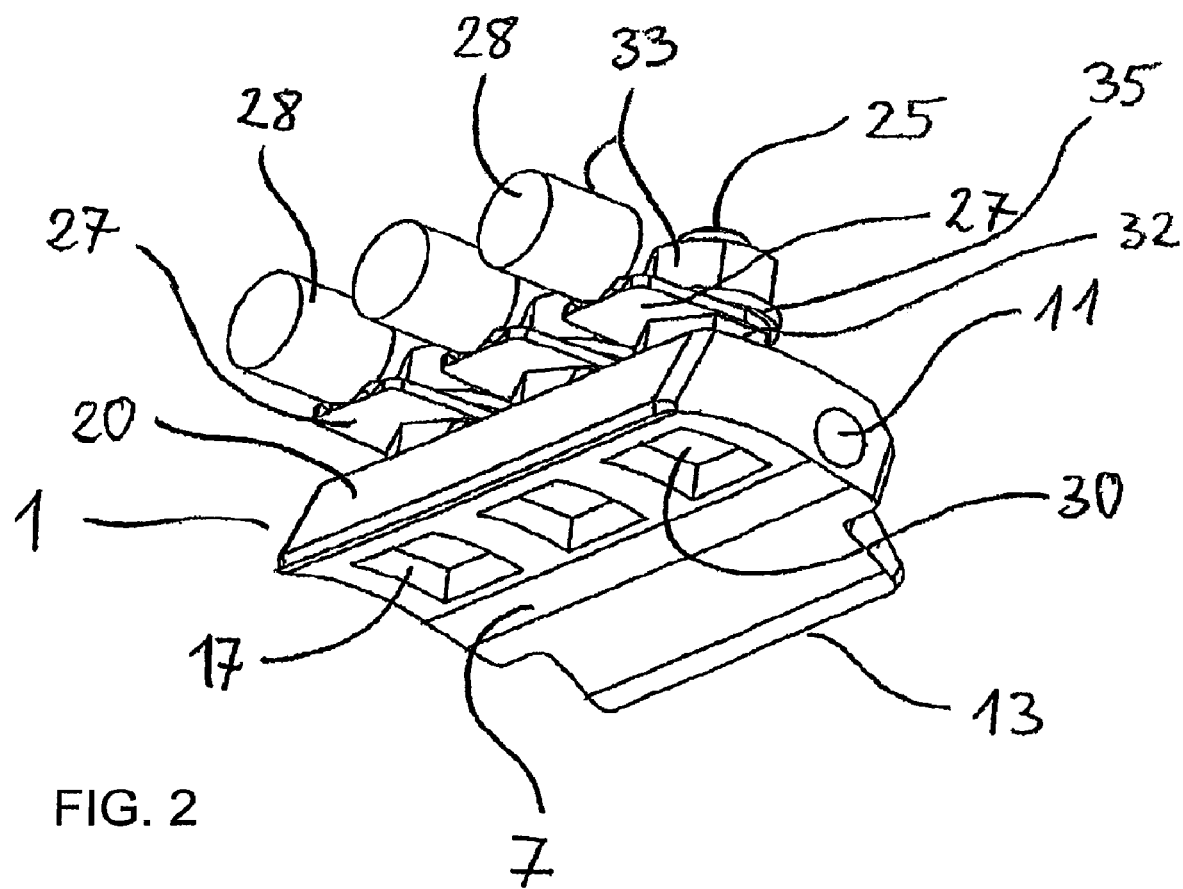

In FIG. 2 the terminal board shown in FIG. 1 is once more represented perspectively. Thus terminals 25 are inserted respectively from below into the multiangled recesses 17. At one terminal 25 is placed a cable lug 27 for connecting an electrical utility line, which respectively exhibits a compression joint 28 for connecting to a cable strand. The cable lugs 27 placed on the terminals 25 are fastened respectively by means of a first nut 32 and a counter/lock nut 33. For a secure electrical contact between the cable lug 27 and the terminal 25 furthermore a washer 35 is introduced. From the terminal 25 moreover the multicornered element 30 set on the shaft end is visible, which sits rotation-free in the multiangled recess 17. Further the compression joint 28 of a cable lug 27 is clearly visible. The corresponding cylindrical part is constructed to make a crimped connection of the cable lug 27 with the strand or wire of the utility line or the connection line. To increase electrical safety, the crimped connection 28 is insulated respectively with a protective sleeve against a contact by touching.

Figure 3:
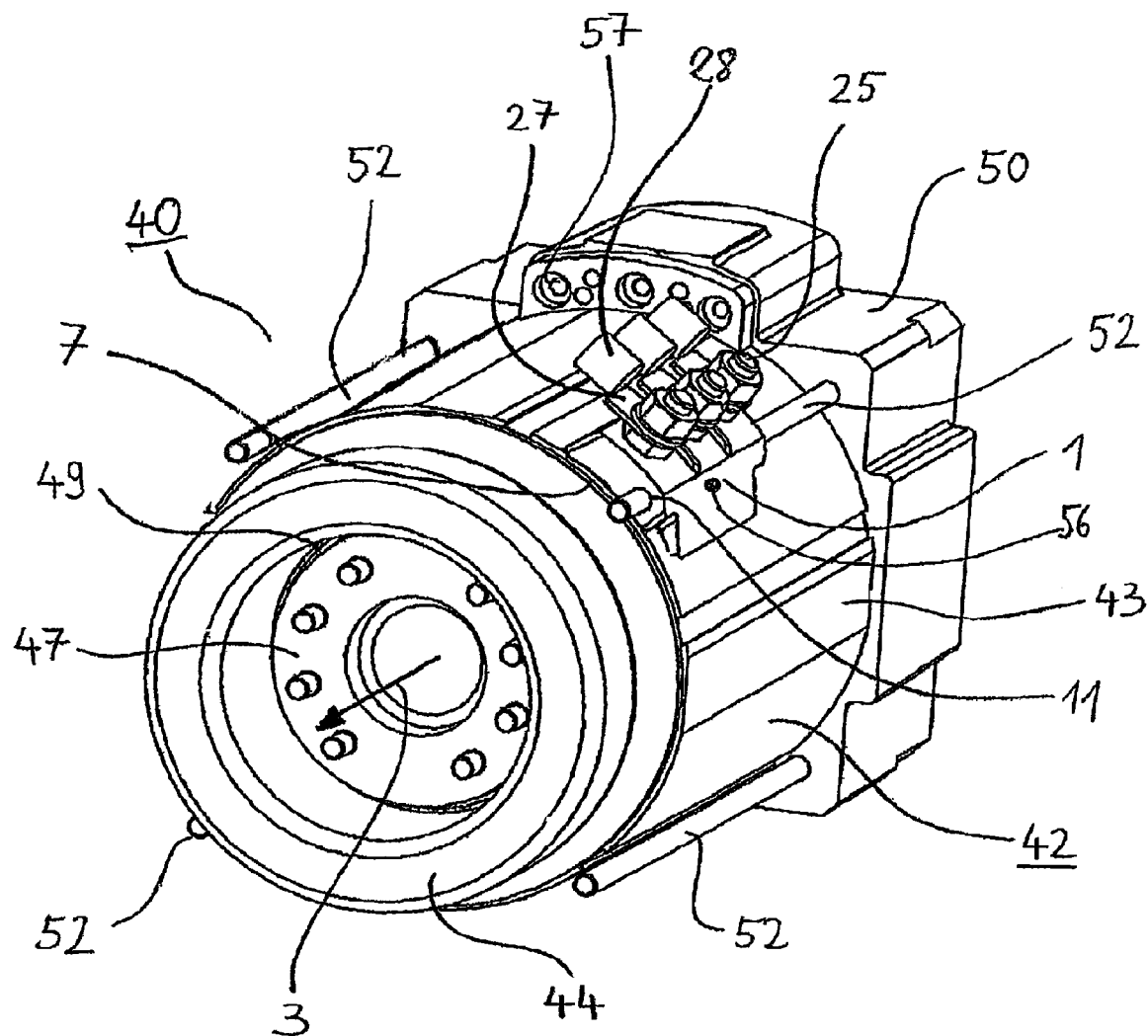

In FIG. 3 a housing-less a synchronous motor 40 is again shown in a perspective representation. Seen on the asynchronous motor 40 is a cylindrical stator 42 extending in a longitudinal direction 3, which consists essentially of a stator sheet-metal wrap 43 and a stator winding 44 disposed on it. The front part of the stator winding 40 is easily recognizable. On the inside of the stator 42 the rotor 47 of the asynchronous motor 40 is evident, which can move opposite the stator 42, through an air gap 49 for this purpose.

The stator 42 is held on a bearing plate 50, into which four cheese-head screws 52 are received. The front bearing plate further needed for receiving the stator 42 and for positioning the machine shaft pulling the rotor 47 is removed in order to see more clearly. In the longitudinal direction of the cylindrical-shaped stator 42 or on the sheet-metal a terminal board 1 according to FIG. 2 is set with its concavely curved bearing surface 7B. Thus the terminal board 1 with its through hole 11 running in a longitudinal direction 3 is shoved at a cheese-head screw 52. This cheese-head screw 52 is fixed in a mounted position of the asynchronous motor 42, as well as to a front bearing plate, not shown, so that the terminal 1 with its bearing surface 7 is pressed against the stator sheet-metal wrap. Practically by means of this step alone is a more secure fastening of the terminal 1 obtained. However to more securely prevent a movement of the terminal 1 along the cheese-head screw 52, a threaded hole is inserted in the terminal 1, with the one set screw 56 screwed in against the cheese-head screw 52 passing through.

To connect electrical utility lines are again the cable lug 27 of the respective terminal 25 already known from FIG. 2 is installed. At the cable lug 27 compression connections 28 are respectively disposed. It is clearly evident from FIG. 2 that by using the terminal 1 which is with its bearing surface concavely curved in a transverse direction 4 placed alongside the stator wrap, a construction space of the asynchronous motor 40 is available that is located facing the bearing plate 50 radially toward the inside. On this basis such an application of the terminal 1 easily leads to a small increase in the construction space and in particular of the casing radius or the casing envelope of the asynchronous motor 40.

For a simplified representation for the terminal 25 only one cable lug 27 respectively is depicted. Above the compression connection 28 in particular a motor-side connection line is in electrical contact, which extends out of one of the apertures 57. The asynchronous motor 40 shown exhibits in this respect three winding cables, which are supplied with an electrical power by three-phase current. The winding cables are thereby operated in a polyphase connection.

Figure 4:
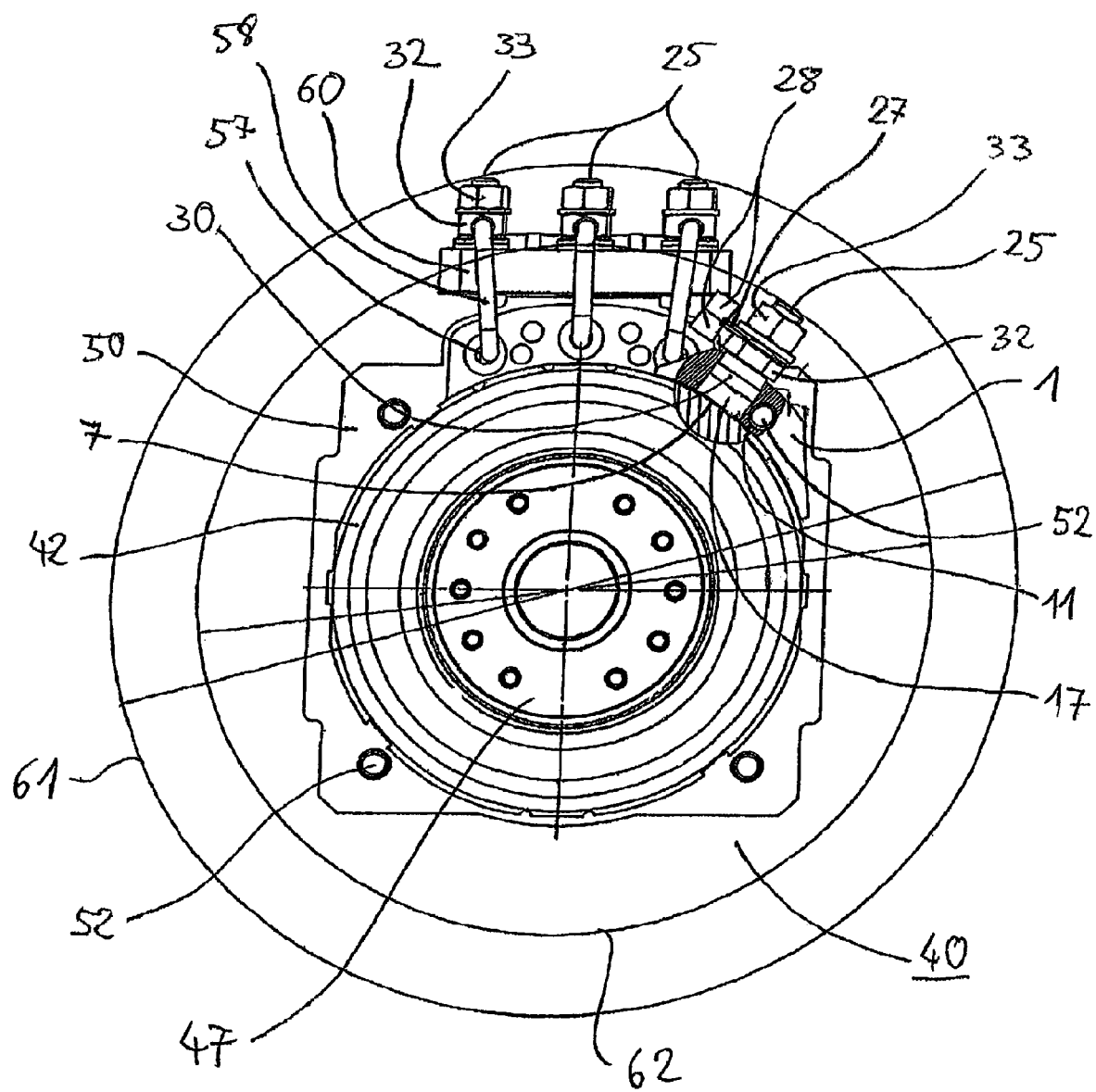

FIG. 4 depicts the asynchronous motor 40 according to FIG. 3 in an exploded view. The rotor 47 can be evident, as well as the stator 42 bending around it. But the front bearing plate is not represented here. Only shown is that the rear bearing plate 50 is shaped essentially rectangularly, whereby the bearing plate 50 is penetrated at four corner points by one cheese-head screw each.

In comparison with a previously described arrangement of a terminal, a terminal 60 is set at the bearing plate 50 of the asynchronous motor 40. In an embodiment according to a stator of the prior art this terminal board 60 also includes terminals 25, whereby above a first nut 32 and a counternut 33 a cable lug is clamped on and thus the motor-side connection lines 58 are in contact.

Further is a terminal board 1 depicted, which is set with its bearing surface 7 on the cylindrical stator 42. The through hole 11 of the terminal board 1 is evident in the part-section view, by means of which the cheese-head screw 52 passes. Further is the multiangled recess 17 recognizable, into which the multicornered element 30 of the terminal 25 is inserted. On the terminals 25 are disposed by means of a first nut 32 and a counternut 33 two cable lugs 27 with a compression connector 28 attached to them respectively. Both the cable lugs 27 serve thereby to connect the motor-side connection line 58 or the external utility line.

In this view is attached, to illustrate the underside of the construction in this view, a first casing radius 61 of the known and a second casing radius 62 of the afore-mentioned terminal board arrangement. Clearly evident is the drastic reduction in the size of the second casing radius 62 compared with the first casing radius 61. The asynchronous motor 45 with a terminal board 1 installed is thus predestined for installation on a provided construction space. For this it is still seen from FIG. 4 that the terminal board 1, compared to the terminal board 60, is disposed in a clearly less exposed position. Herewith in particular the danger of terminal 1 breaking is eliminated, which is provided for immediately for this reason, because fireproof thermoset plastics are known to exhibit brittleness.

Figure 5A:
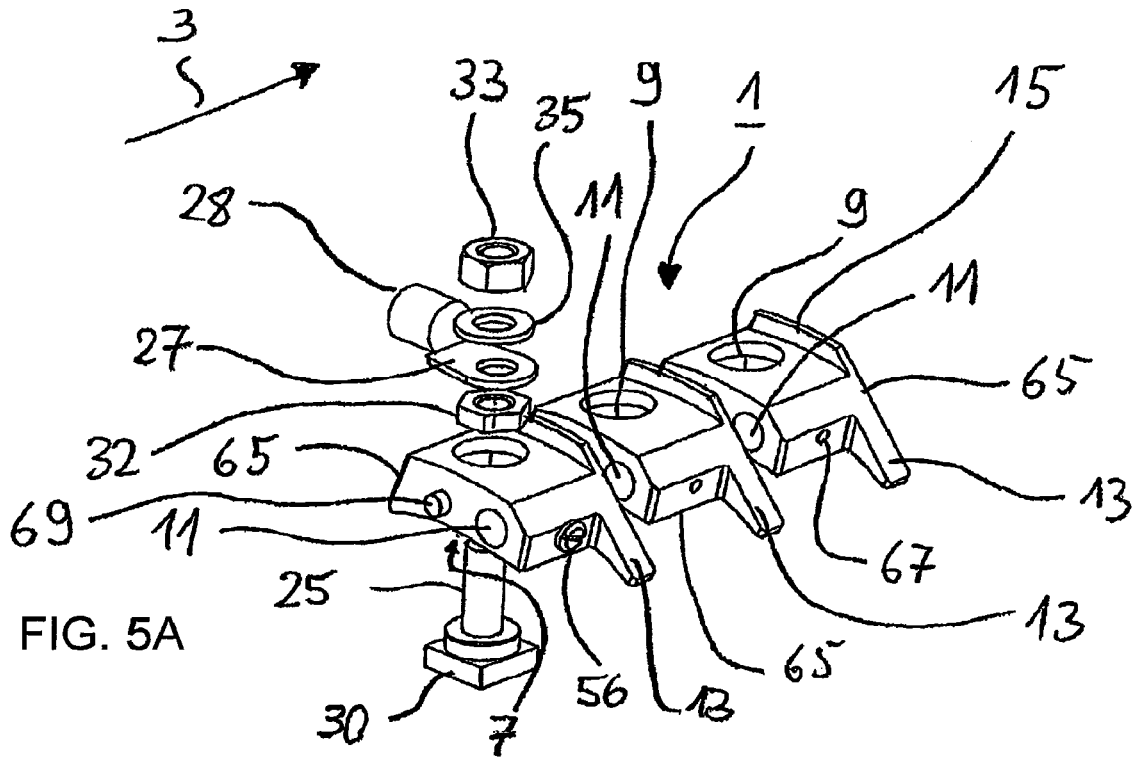

In FIG. 5A is perspectively represented an alternative terminal 1' with a curved bearing surface 7, which can be connect to individual modules 65. Each of the individual modules 65 thus includes a cylindrical drill hole 9 for receiving a terminal 25. Further it exhibits a through hole 11 running in the longitudinal direction 3 for each individual module 65 for fastening to an electrical machine. For fastening each individual module 65 to a penetrating cheese-head screw of the electrical machine one abutting threaded hole 67 is introduced at the diameter respectively, whereby clamping the individual module 65 is made possible facing the penetrating cheese-head screw by means on of a screwed-in set screw 56. Each of the individual modules 65 further includes a bar 15 separating the terminals 25 from one another, as well as a extended contact side 13 to improve support.

For the frontmost individual module 65 in the representation the introduction of a terminal 25 is pictured, as well as the connection to an external utility line. The cylindrical terminal 25 is evident, which exhibits at its bottom end a multicornered element 30. For attachment the terminal 25 is inserted from below against the curved bearing surface 7 in the direction of the cylindrical drill hole 9. Thus its multicornered element 30 comes into a direct pressure lock with a multiangled recess not visible here in the bearing surface 7 and is thus held more immovably. For electrical connection a cable lug 27 is provided, which can make contact with an external utility line by means of a compression connector 28. The cable lug 27 is held fast to the terminal 25 by means of a first nut 32 and a counternut 33. A washer 35 is placed between the counternut 33 and the cable lug 27 for this.

For fitting together the individual module 65, a fittable plug connection is provided in the longitudinal direction 3. This plug connection is achieved by means of a plug element 69, which respectively engages in one recess with the individual module 65 lying above. By means of this plug connection fitting the terminal 1' is made possible when mounting to the electrical machine. The plug connection operates both as a guide in mounting and fore security against movement of the individual modules 65 against one another. Then the mounted individual modules 65 are fixed in two places to the mounting at one of the respective through holes 11 above it by means of the outer cheese-head screw and to another by means of the plug connection and thus then they are immovable.

Figure 5B:
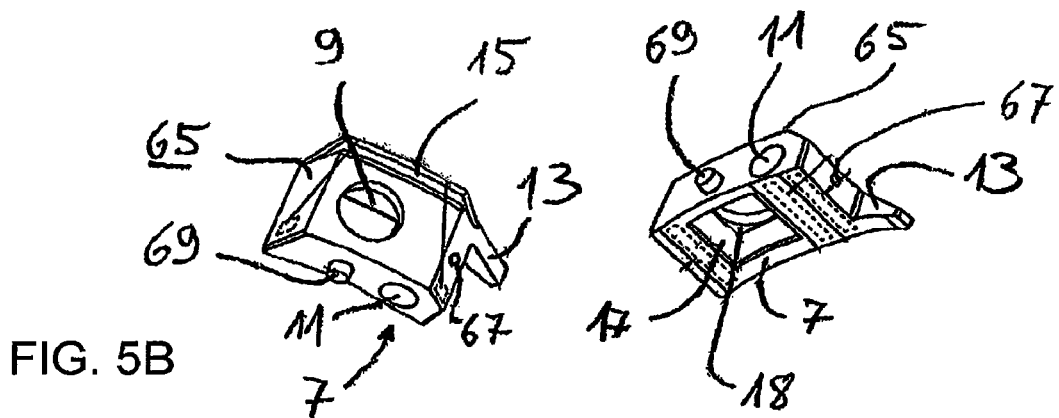

In FIG. 5B is depicted an easily modifiable individual module 65 according to FIG. 5A from a different perspective. Only the details are evident of the through hole 11, the cylindrical drill hole 9, and the plug element 69. Also the extended contact side 13 is readily visible. In particular in the right-hand representation according to FIG. 5B the curved bearing surface 7 is seen. The multiangled recess 17 in the bearing surface 7, as well as the counterbore 18 built into the multi-angled recess at the passage of the multiangled recess 17 into the cylindrical drill hole, are identified. In the multiangled recess 17 is held the removable terminal 25 from FIG. 5A against the counterbore 18 FIG. 5A with its multicornered element 30. Compared to the individual module 65 according to FIG. 5A, the plug 15 is raised higher and is extended in the direction away from the contact side 11. The leakage path between the current-beating parts is thereby extended. This is more safely avoided, so that adjoining cable lugs can be placed beside one another.

Figure 5C:
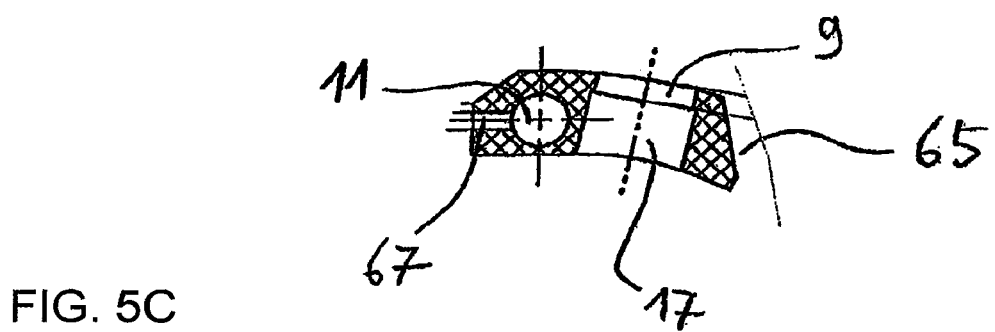

In FIG. 5C a section is depicted across the longitudinal direction 3 of the individual modules 65 according to FIG. 5B. The multiangled recess 17 at the cylindrical drill hole 9 is identifiable. Further the through hole 11 is clearly visible, in which the threaded hole 67 runs.

The invention claimed is:

1. A terminal board for a housing-less electrical machine, comprising:
an electrically insulating base extending in a longitudinal direction and extending in a transverse direction;
a device for fastening said base to the electrical machine; and
a device for attaching a plurality of terminals to said base;
wherein said base is formed with a bearing surface that curves concavely in the transverse direction and that is essentially straight in the longitudinal direction.

2. The terminal board according to claim 1, wherein said bearing surface includes a plurality of concave surfaces with different radii of curvature.

3. The terminal board according to claim 1, wherein said device for fastening said base to the electrical machine includes a through-hole extending through said base in the longitudinal direction.

4. The terminal board according to claim 3, wherein said base is formed with a threaded hole intersecting said through-hole.

5. The terminal board according to claim 1, wherein said base is formed with an upper boundary surface located away from said bearing surface, said upper boundary surface is convexly curved away from said base in the transverse direction, and said upper boundary surface is essentially flat in the longitudinal direction.

6. The terminal board according to claim 5, further comprising a force-locking and/or form-locking rotational locking device for attaching a terminal to said base.

7. The terminal board according to claim 6, wherein said device for attaching a plurality of terminals to said base includes a plurality of cylindrical drill holes, said rotational locking device includes a multi-angled recess formed in said bearing surface and communicating with one of said plurality of cylindrical drill holes, and said upper boundary surface is formed with a counterbore communicating with said one of said plurality of cylindrical drill holes.

8. The terminal board according to claim 1, further comprising a force-locking and/or form-locking rotational locking device for attaching a terminal to said base.

9. The terminal board according to claim 1, wherein said base is formed with a contact side that extends said bearing surface in the transverse direction.

10. The terminal board according to claim 1, wherein said base includes a side formed with a boundary surface slanting downward in the transverse direction toward the outside.

11. The terminal board according to claim 1, wherein said base is formed of a plurality of similar individual modules that are connected together in the longitudinal direction.

12. The terminal board according to claim 11, wherein said device for fastening said base to the electrical machine is constructed in each of said plurality of individual modules, said device for attaching the plurality of terminals to said base includes a plurality of devices for attaching a terminal to said base, and each of said plurality of individual modules includes a respective one of said plurality of devices for attaching a terminal to said base.

13. The terminal board according to claim 1, wherein said base is configured to be fastened to a housing-less asynchronous motor, and the housing-less asynchronous motor is the electrical machine.

14. An electrical machine, comprising:
a cylindrical stator extending along a longitudinal direction, said stator including oppositely disposed bearing plates;
a movably mounted rotor inside of said stator;
a main shaft extending in the longitudinal direction and connected to said rotor, said main shaft including opposite ends mounted at said bearing plates of said stator;
a plurality of terminals; and
a terminal board including:
an electrically insulating base extending in a longitudinal direction and extending in a transverse direction;
a device for fastening said base to said stator; and
a device for attaching said plurality of terminals to said base;
wherein said base is formed with a bearing surface that curves concavely in the transverse direction and that is essentially straight in the longitudinal direction.

15. The electrical machine according to claim 14, further comprising a plurality of cheese-head screws connecting said bearing plates to one another.

16. The electrical machine according to claim 15, wherein said device for fastening said base to said stator includes a through-hole extending through said base in the longitudinal direction and a cheese-head screw running through said through hole in the longitudinal direction, and said cheese-head screw and said through-hole cooperate to attach said bearing surface of said base of said terminal board to said stator.

17. The electrical machine according to claim 16, wherein said cheese-head screw and said through-hole cooperate to attach said bearing surface of said base of said terminal board to said stator with a tension.

18. The electrical machine according to claim 17, further comprising a setscrew, wherein said base is formed with a threaded hole intersecting said through-hole, and said setscrew is screwed into said threaded hole and against said cheese-head screw to prevent said base from moving with respect to said cheese-head screw.

19. The electrical machine according to claim 14, wherein said cylindrical stator, said rotor, and said main shaft form an asynchronous motor.

\* \* \* \* \*